US012578170B2

(12) United States Patent
Knabe, Jr. et al.

(10) Patent No.: US 12,578,170 B2
(45) Date of Patent: Mar. 17, 2026

(54) WEAPON SYSTEM CONTROL HANDLE GAUGE SHAFT

(71) Applicant: Elbit Systems of America, LLC, Fort Worth, TX (US)

(72) Inventors: Robert C. Knabe, Jr., Boynton Beach, FL (US); Juan Sosa Cruz, Boynton Beach, FL (US); Hua Yang, Lake Worth, FL (US); John O. Weber, II, Deerfield Beach, FL (US)

(73) Assignee: Elbit Systems of America, LLC, Fort Worth, TX (US)

( * ) Notice: Subject to any disclaimer, the term of this patent is extended or adjusted under 35 U.S.C. 154(b) by 0 days.

(21) Appl. No.: 18/930,285

(22) Filed: Oct. 29, 2024

(65) Prior Publication Data

US 2025/0146793 A1 May 8, 2025

Related U.S. Application Data

(60) Provisional application No. 63/547,270, filed on Nov. 3, 2023.

(51) Int. Cl.
| | |
|---|---|
| *F41G 5/06* | (2006.01) |
| *G01L 1/22* | (2006.01) |
| *G06F 3/0338* | (2013.01) |

(52) U.S. Cl.
CPC .............. *F41G 5/06* (2013.01); *G01L 1/2231* (2013.01); *G06F 3/0338* (2013.01)

(58) Field of Classification Search
CPC ......... F41G 5/06; G01L 1/2231; G06F 3/0338

USPC .......................................................... 89/1.42
See application file for complete search history.

(56) References Cited

U.S. PATENT DOCUMENTS

| | | | | | |
|---|---|---|---|---|---|
| 3,513,431 | A | * | 5/1970 | Kovacs | G01L 1/2218 |
| | | | | | 73/862.634 |
| 4,876,524 | A | * | 10/1989 | Jenkins | G01L 5/223 |
| | | | | | 73/862.05 |
| 5,912,659 | A | * | 6/1999 | Rutledge | G06F 3/0338 |
| | | | | | 345/161 |
| 2003/0226305 | A1 | * | 12/2003 | Burnett | F41G 3/165 |
| | | | | | 42/90 |
| 2008/0010890 | A1 | * | 1/2008 | Vice | F41C 23/22 |
| | | | | | 42/106 |
| 2008/0288093 | A1 | * | 11/2008 | Kamentser | G05G 9/047 |
| | | | | | 700/85 |

FOREIGN PATENT DOCUMENTS

| | | | | |
|---|---|---|---|---|
| WO | WO-0072300 A1 | * | 11/2000 | G06V 10/17 |

* cited by examiner

Primary Examiner — Bret Hayes
(74) Attorney, Agent, or Firm — Spencer Fane, LLP

(57) ABSTRACT

The devices and systems disclosed herein improve on existing weapon system control handles, by replacing complicated spring and cam components with a gauge shaft. The use of a gauge shaft eliminates unnecessary part-complexity and extra assembly labor. The use of a gauge shaft increases operational response and accuracy while decreasing cost and weight of weapon system control handles. Moreover, the gauge shafts can be readily repaired or replaced, reducing the overall costs of maintenance associated with damaged weapon system control handles. In alternative embodiments, a disk gauge is used in place of gauge shafts.

20 Claims, 11 Drawing Sheets

WEAPON SYSTEM CONTROL HANDLE GAUGE SHAFT

PRIORITY CLAIM AND CROSS-REFERENCE TO RELATED APPLICATIONS

The present application claims priority to, and the benefit of, U.S. Provisional Patent Application 63/547,270 filed Nov. 3, 2023, titled WEAPON SYSTEM CONTROL HANDLE GAUGE SHAFT, the entire contents of which are incorporated herein in their entirety and relied upon.

BACKGROUND

In today's battlefield, the modern soldier must be able to rely on manual control handles to accurately select and lock targets via advanced weapons systems. Existing control handles in legacy ground-based combat vehicles, for example, utilize a conventional mechanical spring and cam system to sense the operational position and/or angle of the control handle. The operation position and/or angle are then converted into corresponding electrical signals for related control of the particular weapon system.

More specifically, existing control handles consist of fairly complicated mechanisms to convert the commanding force into a wide range of rotation angles, and then transpose them into an appropriate electrical signal. Notably, current handles may use cams, springs, or other similar mechanisms to convert a commanding force into an electrical signal. Cams, springs, or other similar mechanisms for these applications are complex, expensive, and difficult to replace. Specifically, the use of complex mechanisms adds weight and increases overall assembly labor and replacement time. Furthermore, these mechanisms do not have a linear force-rotation relationship, which, in turn, means that existing control handles do not have a continuous linear voltage output. Therefore, existing control handles lack quick operational response and accuracy.

Improved weapon system control handles that are less complex, lighter, cheaper, while simultaneously increasing operational response and accuracy are therefore needed.

SUMMARY

The devices and systems disclosed herein improve on existing weapon system control handles, by replacing complicated spring and cam components with a gauge shaft. The use of a gauge shaft eliminates unnecessary part-complexity to the overall system. Additionally, the use of a gauge shaft increases operational response and accuracy, while decreasing cost and weight of weapon system control handles. Moreover, the gauge shafts can be readily repaired or replaced as a discrete unit, thus reducing the overall costs of maintenance for damaged weapon system control handles, therefore reducing total cost of ownership of the system.

In light of the disclosure herein, and without limiting the scope of the invention in any way, in a first aspect of the present disclosure, which may be combined with any other aspect listed herein unless specified otherwise, a weapon system control handle including a main body with a handle stick, a deflection collar, a base and a gauge shaft. The gauge shaft has a first end and a second end and includes a plurality of strain gauges. The main body is coupled to the gauge shaft at the first end, and the gauge shaft is coupled to the base at the second end. The deflection collar is coupled to the base and the gauge shaft is disposed within the inner diameter of the deflection collar.

In a second aspect of the present disclosure, which may be combined with any other aspect listed herein unless specified otherwise, the gauge shaft is made of a 17-4 steel alloy.

In a third aspect of the present disclosure, which may be combined with any other aspect listed herein unless specified otherwise, the gauge shaft has a hollow, cylindrical shape and includes multiple serrations. The multiple serrations are configured to deflect in a radial direction.

In a fourth aspect of the present disclosure, which may be combined with any other aspect listed herein unless specified otherwise, the multiple serrations are rectangular in geometry and arranged such that there are rows of four equally spaced rectangular serrations around the diameter of the gauge shaft.

In a fifth aspect of the present disclosure, which may be combined with any other aspect listed herein unless specified otherwise, the gauge shaft includes eight equally spaced rows of serrations, such that the last of the rows is 0.5 inches from the second end of the gauge shaft.

In a sixth aspect of the present disclosure, which may be combined with any other aspect listed herein unless specified otherwise, there are four strain gauges coupled to the gauge shaft at locations between four rectangular serrations on the row located seventh in from the second end of the gauge shaft.

In a seventh aspect of the present disclosure, which may be combined with any other aspect listed herein unless specified otherwise, the strain gauges are coupled to the gauge shaft via an epoxy.

In an eight aspect of the present disclosure, which may be combined with any other aspect listed herein unless specified otherwise, the strain gauges are configured to generate a voltage in response to deflection in a radial direction.

In a ninth aspect of the present disclosure, which may be combined with any other aspect listed herein unless specified otherwise, also includes a CPU board connected to the plurality of strain gauges and configured to receive voltage generated by the plurality of strain gauges and process the voltage in a real-time X-Y location.

In a tenth aspect of the present disclosure, which may be combined with any other aspect listed herein unless specified otherwise, a control handle gauge shaft that includes a first end, a second end, multiple serrations, and multiple strain gauges.

In an eleventh aspect of the present disclosure, which may be combined with any other aspect listed herein unless specified otherwise, the control handle gauge shaft is made of 17-4 steel alloy.

In a twelfth aspect of the present disclosure, which may be combined with any other aspect listed herein unless specified otherwise, the gauge shaft has a hollow, cylindrical shape.

In a thirteenth aspect of the present disclosure, which may be combined with any other aspect listed herein unless specified otherwise, the gauge shaft has a hollow, cylindrical shape with an outer diameter of 0.6 inches and an inner diameter of 0.5 inches.

In a fourteenth aspect of the present disclosure, which may be combined with any other aspect listed herein unless specified otherwise, further includes a wire opening.

In a fifteenth aspect of the present disclosure, which may be combined with any other aspect listed herein unless specified otherwise, the distance from the first end to the second end is 5 inches.

In a sixteenth aspect of the present disclosure, which may be combined with any other aspect listed herein unless specified otherwise, the multiple serrations are rectangular in geometry and arranged such that there are rows of four equally-spaced rectangular serrations around the diameter of the gauge shaft, and the gauge shaft includes eight equally-spaced rows of serrations, such that the last of the rows is 0.5 inches from the second end of the gauge shaft.

In a seventeenth aspect of the present disclosure, which may be combined with any other aspect listed herein unless specified otherwise, the multiple strain gauges are four strain gauges, and the four strain gauges are coupled to the gauge shaft at the locations between the four rectangular serrations on the row located seventh in from the second end of the gauge shaft.

In an eighteenth aspect of the present disclosure, which may be combined with any other aspect listed herein unless specified otherwise, the multiple serrations are configured to deflect in radial directions from 0 to 360 degrees in response to mechanical force.

In a nineteenth aspect of the present disclosure, which may be combined with any other aspect listed herein unless specified otherwise, the strain gauges are configured to generate a voltage in response to deflection in a radial direction.

In a twentieth aspect of the present disclosure, which may be combined with any other aspect listed herein unless specified otherwise, also includes a CPU board connected to the strain gauges and configured to receive voltage generated by the strain gauges and process the voltage in a real-time X-Y location.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Figure 1:
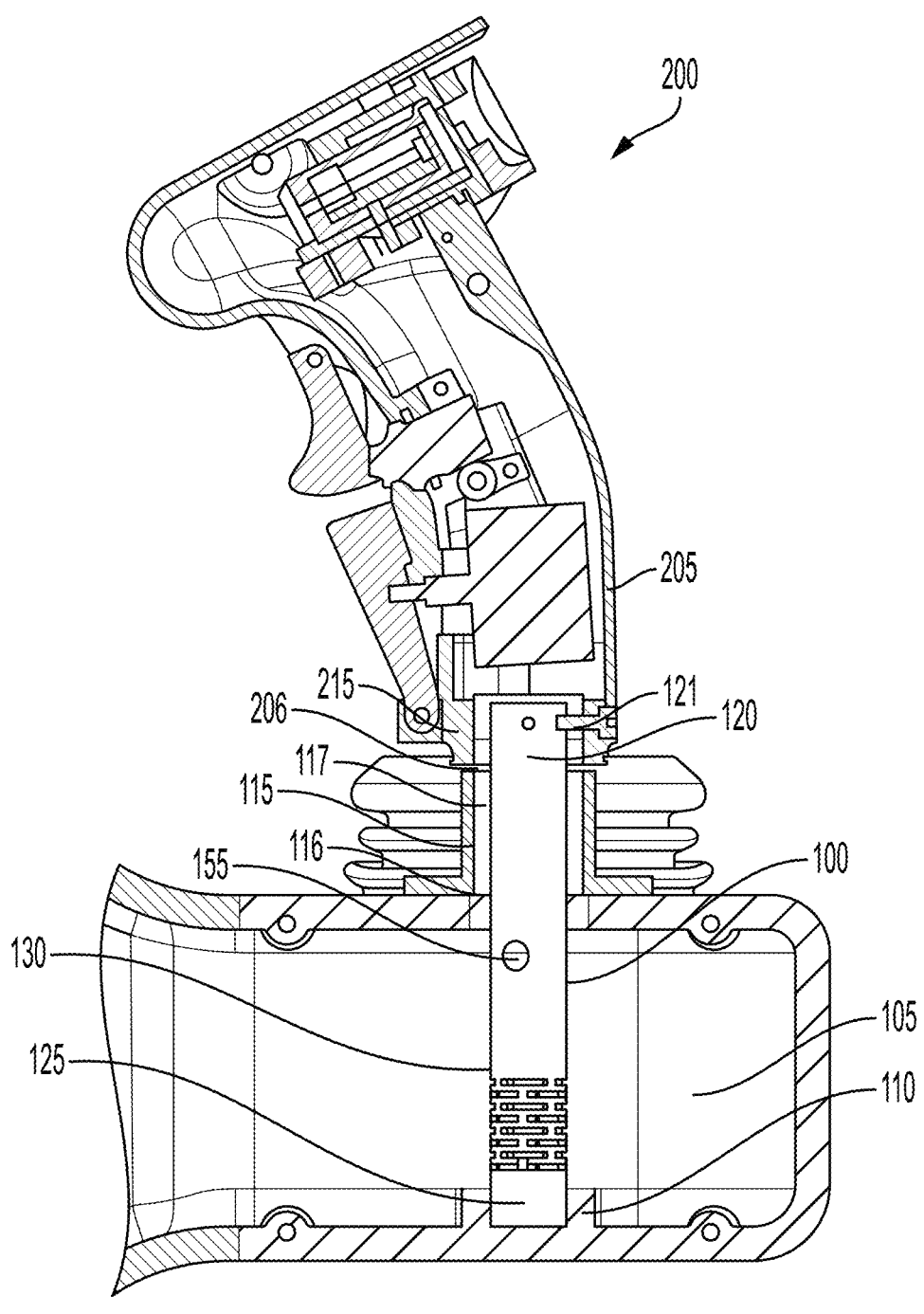
FIG. 1 illustrates a side, cross-sectional view of a primary embodiment of a weapon system control handle, according to an example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specific to the presence of stated features, integers, steps, operations, elements, and/or components, but do not preclude the presence or additional of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent"). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Primary Embodiment: One-Hand Weapon System Control Handle with Shaft Gauge

Disclosed herein are devices and systems, which may advantageously be implemented to reduce complexity and cost, while improving accuracy and overall efficiency of weapon system control handles. Specifically, FIG. 1 illustrates a side, cross-sectional view of a weapon system control handle 200 (also referred to herein more generally as handle 200). The handle 200 includes a main body 205, a base 105, a deflection collar 115, and a weapon system control handle gauge shaft 100 (also referred to herein more generally as shaft 100).

As seen in FIG. 1, the main body 205 is coupled to the deflection collar 115. The main body 205 also couples to the shaft 100 at a connection end 206, which is located on the lower part of the main body 205, via a coupling point 215 on the main body 205. In some embodiments, the shaft 100 couples to the main body, 205 at the coupling point 215 via a coupling mechanism 121, such as a screw. Relatedly, the deflection collar 115 is coupled to the base 105 at the collar point 116. The base 105 is configured to receive the shaft 100, such that when the shaft is inserted into the base 105, the second end 125 couples to the base 105 at a receiving portion 110. Notably, the shaft 100 is disposed within, but not coupled to, the deflection collar 115 such that there is a distance between the outer diameter of the shaft 100 and the inner diameter of the deflection collar 115. In an embodiment, second end 125 of shaft 100 couples to base 105 via a press-fit; in a different embodiment, second end 125 of shaft 100 couples to the base 105 via one or more mechanical fasteners. In one embodiment, the deflection collar 115 is a one-piece part which is a flange type of component with an overall height of 1.06 inches, 1.17 inch open diameter of the cylindrical part and 2.23 inch length×1.23 inch oblong shape base). It should be appreciated that other dimensions are similarly contemplated herein.

In an embodiment, the shaft 100 includes a first end 120 and a second end 125. Between the first end 120 and second end 125 there is a serrated section 130. It should be appreciated that the shaft 100 may include multiple serrated sections 130 between first end 120 and second end 125. Between the first end 120 and the serrated section 130 there is a wire opening 155. Serrated section 130 is a portion of shaft 100 with less overall material (i.e., due to plurality of serrations 135 or gaps along the serrated section 130); by having less overall material, any force imparted along shaft 100 causes increased strain along serrated section 130. Thus, serrated section 130 is mechanically configured to received increased localized strain, measured by sensors as discussed in greater detail herein.

Continuing on, when inserted into the base 105, the serrated section 130 and wire opening 155 are located within the base 105, and the first end 120 remains "outside" of the base 105. The deflection collar 115 couples to the base 105, such that the deflection collar 115 surrounds a portion of the first end 120 that remains "outside" of the base 105; a portion of the first end 120 nonetheless remains "outside" of the deflection collar 115.

The portion of the first end 120 that remains outside the deflection collar 115 couples with the main body 205 via a coupling point 215 on the main body. In some embodiments, the shaft 100 couples to the main body 205 at the coupling point 215 via a coupling mechanism 121, such as a screw. In an embodiment, various wires (not shown) are connected to strain gauges (not shown) when the strain gauges are disposed on or coupled to the serrated section 130. These wires are guided through the inside of the shaft 100, exit through the wire opening 155 and connect to a CPU board located outside the shaft 100.

It should be noted that the serrated section 130 is configured to transmit mechanical forces from the main body 205, such that the shaft 100 can bend radially around a 360-degree range. Relatedly, the deflection collar 115 is configured to interact with the shaft 100 so as to prevent mechanical overload and damage to the shaft from hyperextension. Specifically, the inner diameter of the deflection collar 115 exceeds the outer diameter of the shaft 100, such that the shaft 100 nests inside the inner diameter of the deflection collar 115 and there is a deflection gap 117 between the deflection collar 115 and the shaft 100. As such, the deflection gap 117 allows the shaft 100 to move within the deflection collar 115, but also limits the movement of the shaft beyond the range of motion defined by the deflection gap 117. For example, an upper end of deflection collar 115 contacts the first end 120 of shaft 100 when shaft 100 flexes; this contact prevents hyperextension of shaft 100. In one embodiment, the deflection gap 117 is 0.140 inches radially.

Figure 2:
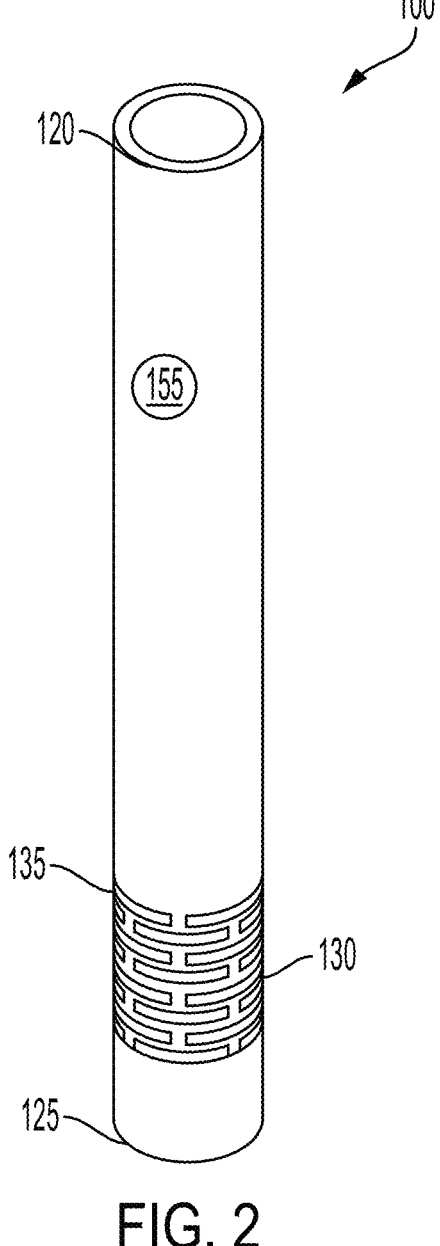
FIG. 2 illustrates an isometric view of a primary embodiment of a weapon system control handle gauge shaft, according to an example embodiment of the present disclosure.

FIG. 2 shows an isometric view of the shaft 100. In an embodiment the shaft 100 is constructed from 17-4 steel alloy. However, alternate embodiments can be constructed from other materials configured to withstand the forces associated with consistent deflections, such as 302B or 304H stainless steel. The shaft 100 has a general hollow tubular shape with first end 120 and second end 125. In an embodiment, the outer diameter of the shaft 100 is 0.6 inches, and the inner diameter is 0.5 inches. In alternate embodiments, the outer and inner diameters of the shaft 100 vary. In one embodiment, the diameters can range from 0.50 to 1.00 inches. It should be appreciated that other dimensions are similarly contemplated herein.

Figure 3:
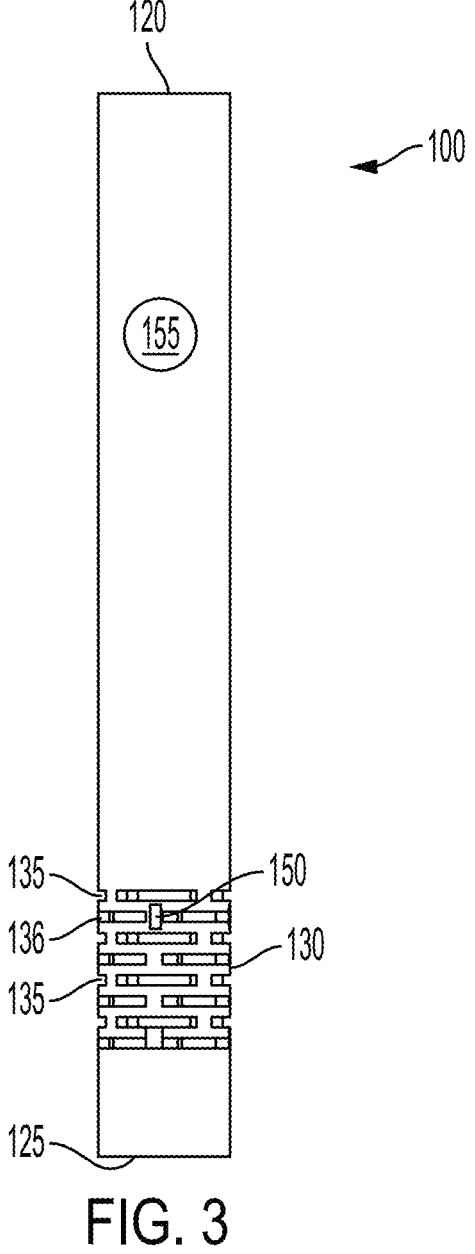
FIG. 3 illustrates a side view of a primary embodiment of a weapon system control handle gauge shaft, according to an example embodiment of the present disclosure.

FIG. 3 shows a side view of the shaft 100. In an embodiment, the length of the shaft 100 from the first end 120 to the second end 125 is 5 inches. In alternate embodiments, the length of the shaft 100 can vary to accommodate different sizes of handles 200. For example, in one embodiment, the shaft 100 ranges from 3.50 to 5.50 inches in length. The wire opening 155 is located between the first end 120 and the serrated section 130, at a distance from the first end 120. The location of the wire opening 155 can vary such that the position of the wire opening 155 guides wires coming from the inside of the shaft 100 to a CPU board.

As seen in FIG. 3, the serrated section 130 is located between the second end 125 and the first end 120. Specifically, in an example embodiment, the serrated section begins 0.5 inches from the second end 125. However, in alternate embodiments, the serrated section begins between 0.5 to 0.6 inches from the second end 125. Moreover, in this embodiment, the serrated section 130 includes eight rows of rectangular serrations 135, with equal spacing between rows. The specific spacing is based on the material properties of the shaft 100 and the amount of deformation needed. Each row of serrations 135 includes four rectangular serrations 135 that surround the diameter of the shaft 100, and are equally spaced from one another. Between rows, the rectangular serrations 135 are offset 90 degrees from each other in the left-right direction. The geometry and dimensions of the serrations 135 can vary such that the serrated section 130 is configured to withstand deflection forces transferred from movement of the main body 205 while simultaneously ensuring that serrated section 130 receives increased localized strain.

Relatedly, in this embodiment, strain gauges 150 are coupled to four points along a strain gauge row 136 by way of an epoxy. The strain gauge row 136 corresponds with the second row of serrations 135 closest to the first end 120. It should be noted that the location of the strain gauge row 136 and number of strain gauges 150 could vary in different embodiments. The location of the strain gauge row 136 and number of strain gauges 150 is determined by the material properties of the shaft 100 and the amount of deformation needed, but the location and number must be symmetrical in both directions. Importantly, when a force is placed on the shaft 100, the force activates the strain gauges 150. When the strain gauges 150 activate, they transmit corresponding signals, in the form of a voltage, to a CPU board. The CPU board then processes the incoming signals into corresponding X-Y plane positions of the handle 200.

Figure 4A:
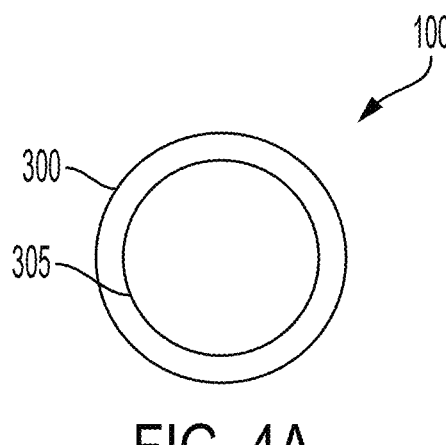
FIGS. 4A-B illustrate top, cross-sectional views of a primary embodiment of a weapon system control handle gauge shaft, according to an example embodiment of the present disclosure.
Figure 4B:
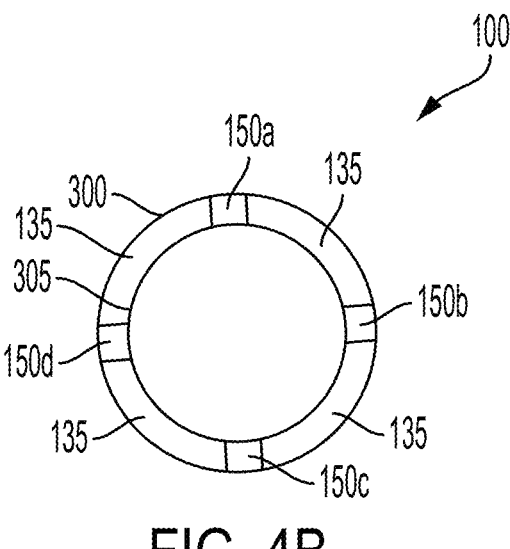

FIGS. 4A-B illustrate top, cross-sectional views of the shaft 100. Specifically, FIG. 4A shows a top, cross-sectional view of a non-serrated portion of the shaft 100. As previously noted, the shaft 100 is hollow and therefore includes an outer diameter 300 and an inner diameter 305. Relatedly, FIG. 4B shows a top, cross-sectional view of a strain gauge row of the shaft 100. As seen in FIG. 4B, in this embodiment, there are four serrations 135. Importantly, there are four different strain gauges 150a-d which couple to the shaft 100 at equally spaced locations between the serrations 135. The strain gauges 150a-d include wires (not shown) that are located inside the shaft 100 and exit the shaft 100 through the wire opening 155 (see FIGS. 1-3) to connect with a CPU board.

Figure 5:
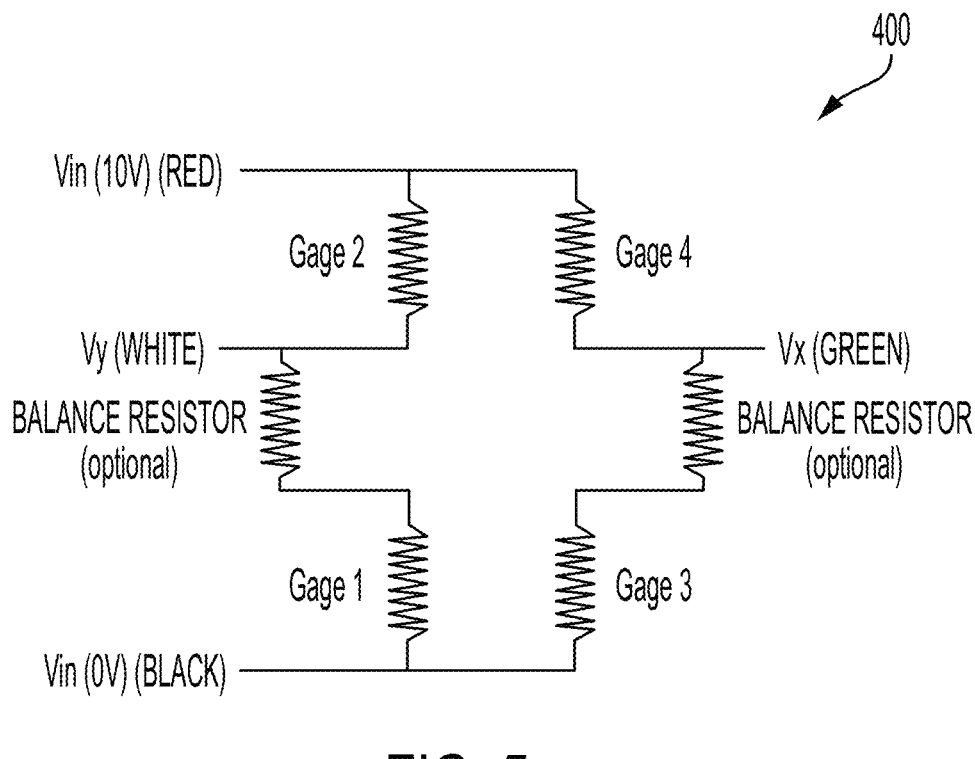
FIG. 5 illustrates a circuitry diagram of sensors in a primary embodiment of a weapon system control handle gauge shaft, according to an example embodiment of the present disclosure.

FIG. 5 illustrates a circuitry diagram of sensors in a weapon system control handle gauge shaft 400. Specifically, circuit 400 illustrates the resistive array of strain gauges 150a-d in the embodiment previously described herein. Moreover, FIG. 5 shows a typical Wheatstone bridge half bridge circuit, it converts the signal of the change of the electrical resistance (caused by the mechanical deformation) into electrical voltage signal. Again, it is worth noting that this invention contemplates alternative configurations of serrations 135 (e.g., more or fewer rows, different geometries about shaft 100, and the like) and alternate configurations of strain gauges 150 (e.g., more or fewer gauges, different positions of gauges, and the like).

Figure 6:
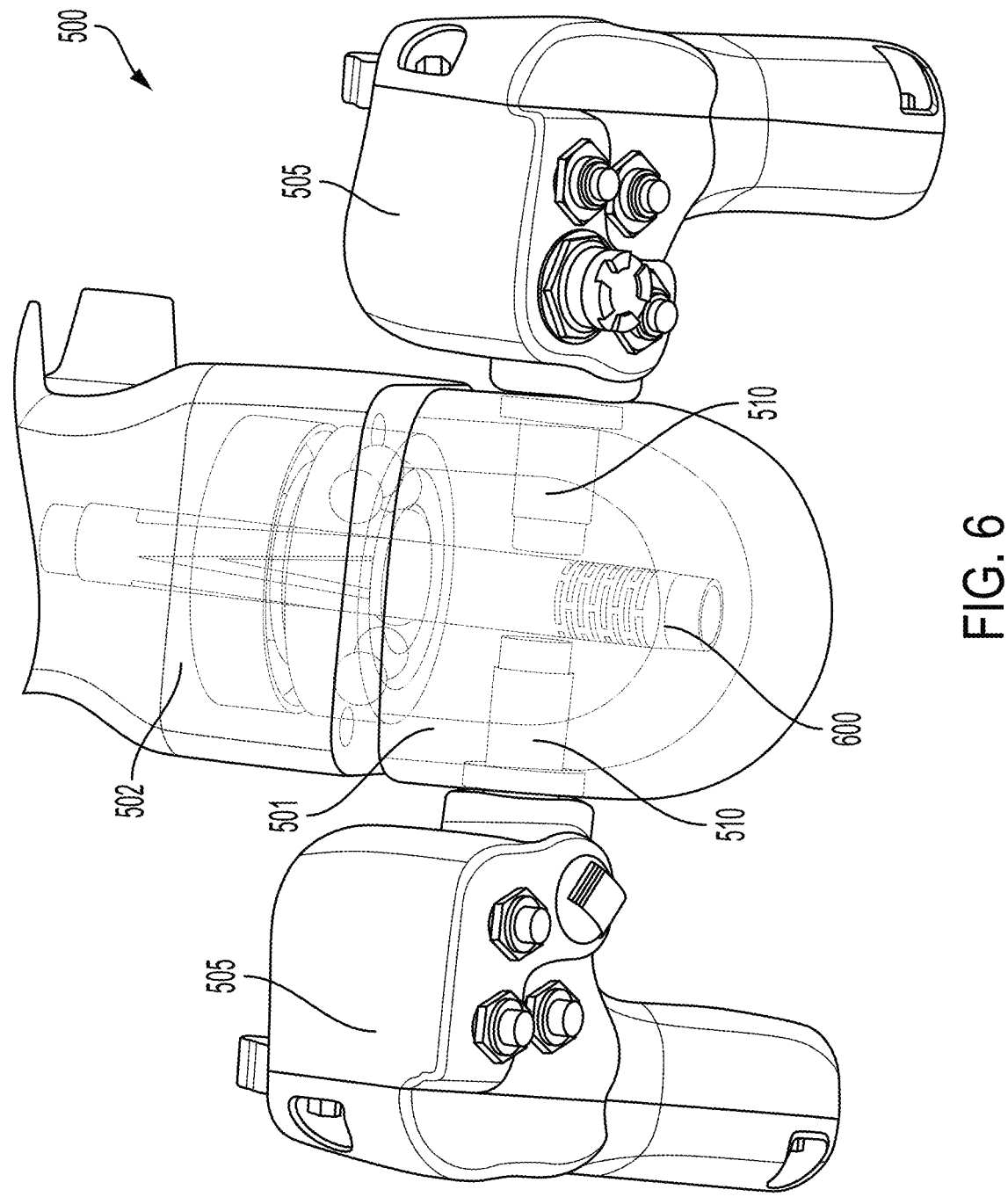
FIG. 6 illustrates a top perspective view of a two-hand weapon system control handle, according to an example embodiment of the present disclosure.

Alternate Embodiment: Two-Hand Weapon System Control Handle With Shaft Gauge There exists multiple, alternate embodiments for the weapon system control handle disclosed herein. Specifically, FIG. 6 illustrates a two-hand weapon system control handle 500 (also referred to herein more generally two-hand handle). Two-hand handle 500 includes a main body 501, two handle components 505, handle motion transfers 510, a deflection collar 515 (see FIG. 7), a base 502, and a weapon system control handle gauge shaft 600 (also referred to herein more generally as shaft 600).

Figure 7:
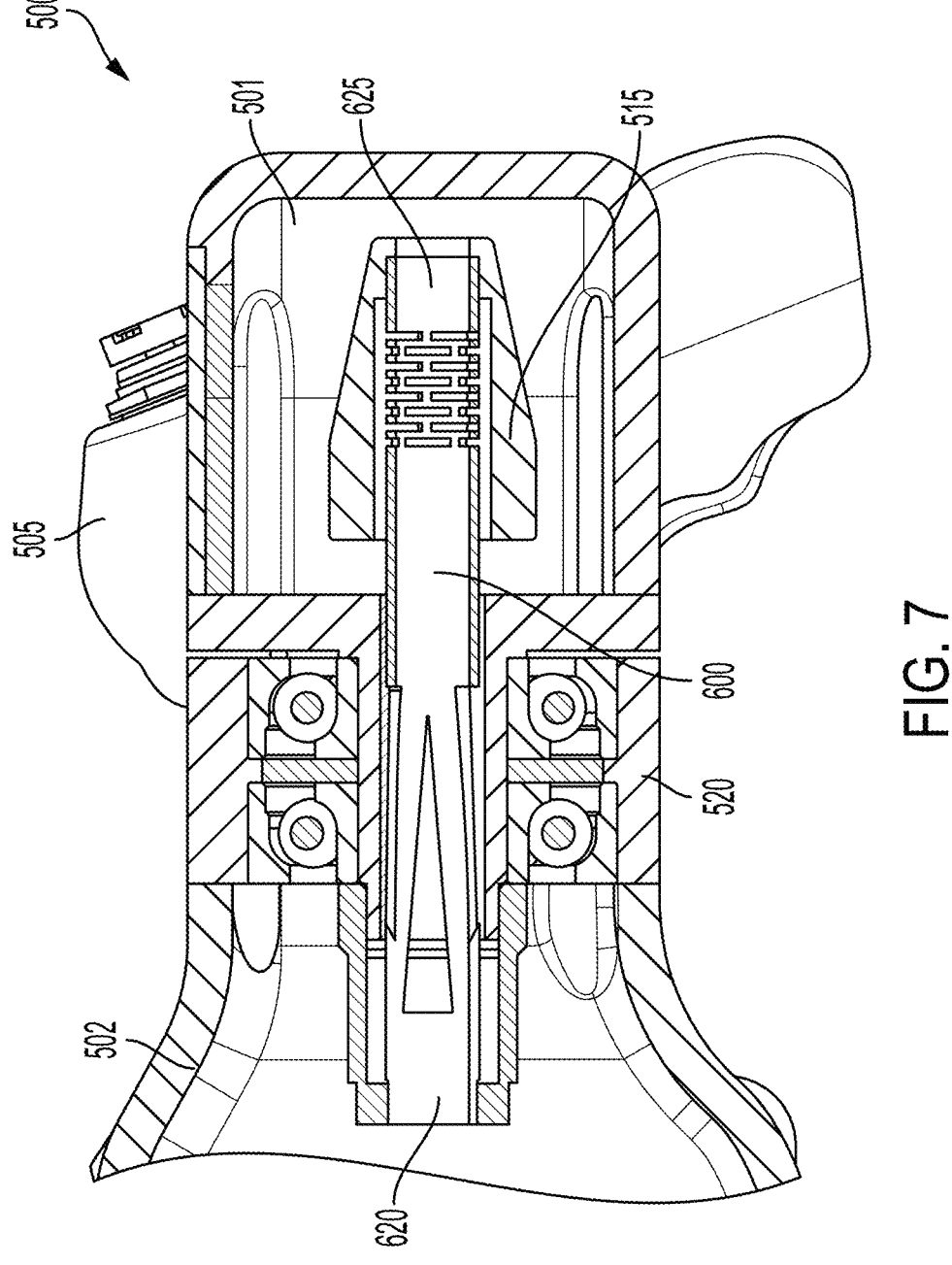
FIG. 7 illustrates a side, cross-sectional view of a two-hand weapon system control handle, according to an example embodiment of the present disclosure.

As seen in FIG. 6, the two handle components 505 flank and couple to bearings (not shown) on the sides of the main body 501. Moreover, the handle motion transfers 510 extend from each handle component 505 towards and perpendicular to the shaft 600 and are coupled to the deflection collar 515. Relatedly, FIG. 7 illustrates a side, cross-sectional view of the two-hand handle 500. As seen in FIG. 7, the deflection collar 515 couples to the main body 501. Moreover, the shaft 600 couples to the base 502 at a first end 620 and the shaft 600 is disposed within the deflection collar 515 at a second end 625. Notably, the base 502 can include turning components 520 configured to allow users to turn two-hand handle 500 in a steering wheel fashion using the two handle components 505 and main body 501. Notably, the handle motion transfers 510 transfer turning/twisting forces to the shaft 600 when the user turns the two handle components 505.

Figure 8:
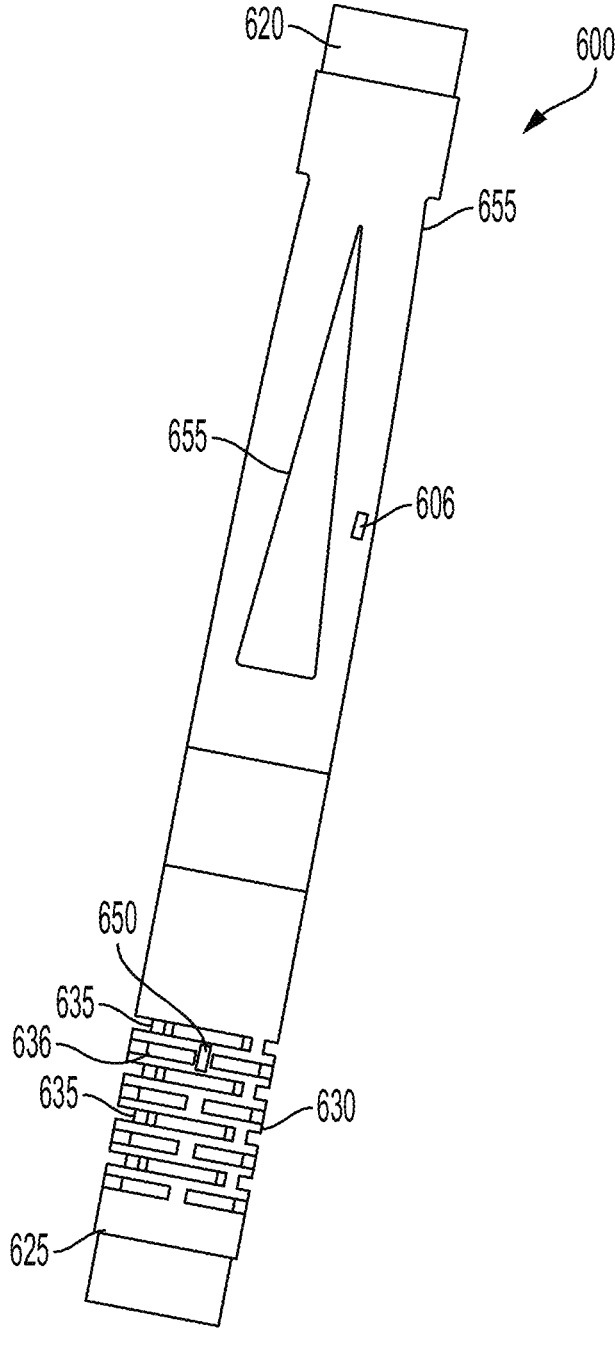
FIG. 8 illustrates a side view of a two-hand weapon system control handle gauge shaft, according to an example embodiment of the present disclosure.

The gauge shaft 600 in the two-hand weapon system control handle 500 is similar to the gauge shaft 100 in the primary embodiment, but also includes triangular cutouts 655, as explained below. FIG. 8 shows a side view of the shaft 600. In an embodiment, the length of the shaft 600 from the first end 620 to the second end 625 is 5 inches. In alternate embodiments, the length of the shaft 600 can vary to accommodate different sizes of handles 500. For example, in one embodiment, the shaft 600 ranges from 3.50 to 5.50 inches in length. A wire opening (not shown on FIG. 8) is located between the first end 620 and the serrated section 630, at a distance from the first end 620. The location of the wire opening can vary such that the position of the wire opening guides wires coming from the inside of the shaft 600 to a CPU board.

As seen in FIG. 8, the serrated section 630 is located between the second end 625 and the first end 620. Specifically, in an example embodiment, the serrated section begins 0.5 inches from the second end 625. Moreover, in this embodiment, the serrated section 630 includes eight rows of rectangular serrations 635, with equal spacing between rows. Each row of serrations 635 includes four rectangular serrations 635 that surround the diameter of the shaft 600, and are equally spaced from one another. Between rows, the rectangular serrations 635 are offset 90 degrees from each other in the left-right direction. The geometry and dimensions of the serrations 635 can vary such that the serrated section 630 is configured to withstand deflection forces transferred from movement of the main body 501.

Relatedly, in this embodiment, strain gauges 650 are coupled to four points along a strain gauge row 636 by way of an epoxy. The strain gauge row 636 corresponds with the second row of serrations 635 closest to the first end 620. It should be noted that the location of the strain gauge row 636 and number of strain gauges 650 could vary in different embodiments. Importantly, when a force is placed on the shaft 600, the force activates the strain gauges 650. When the strain gauges 650 activate, they transmit corresponding signals, in the form of a voltage, to a CPU board. The CPU board then processes the incoming signals into corresponding X-Y plane positions of the handle 500.

Additionally, the shaft 600 includes four triangular cutouts 655, which are located between the first end 620 and the serrated section 630. Specifically, in an embodiment, the triangular cutouts 655 begin about 0.5 inches from the first end 620. Moreover, in this embodiment, the four triangular cutouts 655 surround the periphery of the shaft 600 side by side, such that the base of one triangular cutout 655 corresponds with the tip of another triangular cutout 655, with equal spacing between the triangular cutouts 655. In this embodiment, the triangular cutouts 655 are 0.25 inches wide and 2.00 inches long. The geometry and dimensions of the triangular cutouts 655 can vary such that the shaft 600 is configured to withstand deflection/twisting forces that correspond to the user moving the two handle components 505 in a steering wheel fashion. Importantly, strain gauges 606 are coupled to two points across from each other and about 40% up the side of the triangular cutouts 655 from the end of the triangular cutouts 655 closest to the serrated section 630. The strain gauges 606 are coupled the shaft 600 via an epoxy and are coupled to the external surface of the shaft 600.

It should be noted that the location of the strain gauges 606 and number of strain gauges 606 could vary in different embodiments. Importantly, when a force is placed on the shaft 600 in a twisting motion, the force activates the strain gauges 606. When the strain gauges 606 activate, they transmit corresponding signals, in the form of a voltage, to a CPU board. The CPU board then processes the incoming signals into corresponding X-Y plane positions of the handle 600.

Alternate Embodiment: One-Hand Weapon System Control Handle With Disk Gauge

Figure 9:
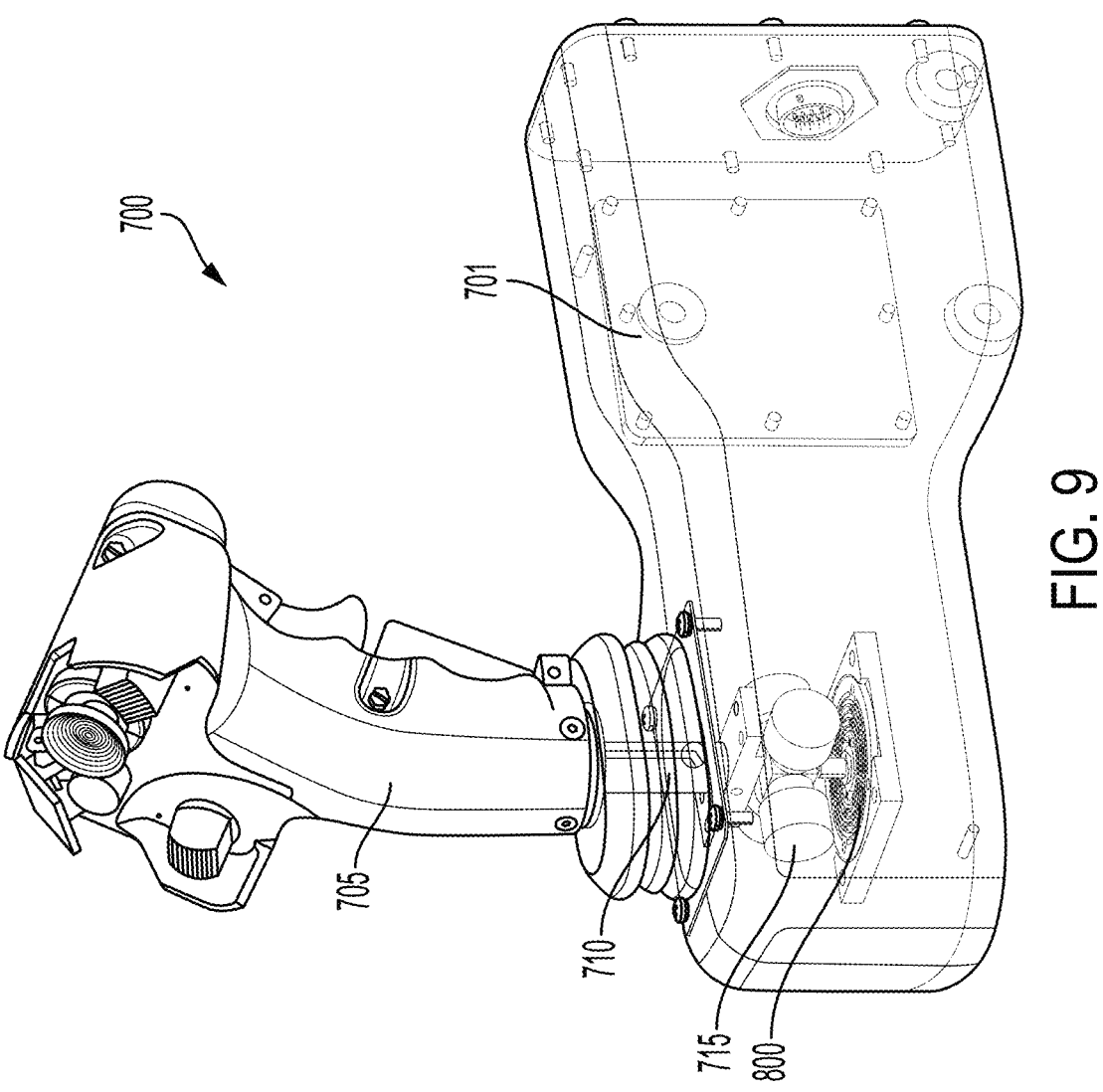
FIG. 9 illustrates a top perspective view of an alternate one-hand weapon system control handle, according to an example embodiment of the present disclosure.

In another embodiment the weapon system control handle includes a disk gauge instead of a shaft gauge. Specifically, FIG. 9 illustrates an alternate one-hand weapon system control handle 700 (also referred to herein more alternate handle). The alternate handle 700 includes a main body 705, a base 701, a handle coupler 710, movement transfers 715, and a weapon system control handle gauge disk 800 (also referred to herein more generally as disk gauge 800).

Figure 10:
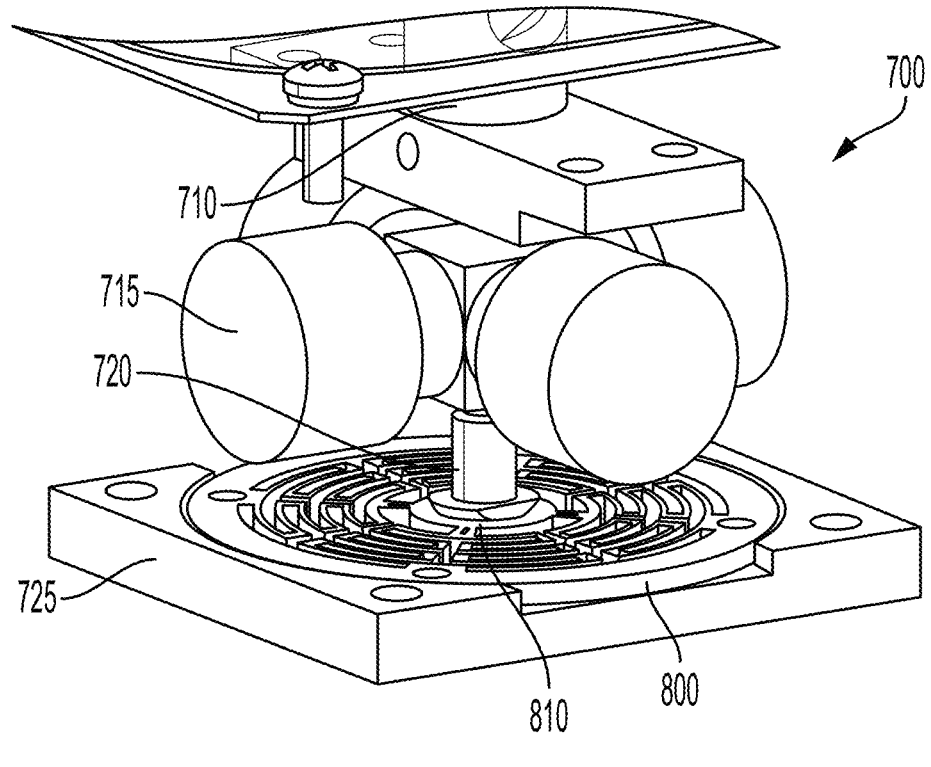
FIG. 10 illustrates an internal, side perspective view of an alternate one-hand weapon system control handle, according to an example embodiment of the present disclosure.

As seen in FIG. 9, the main body 705 couples to the movement transfers 715 via the handle coupler 710. As seen in FIG. 10, the disk gauge 800 is coupled to a plate 725 which is coupled to the base 701 (see FIG. 9). There is a deflection collar coupled to the base 701 that the handle coupler 710 is passed through but is not coupled to. The handle coupler 710 then couples to movement transfers 715, which are in the base 701. Moreover, the movement transfers 715 engage with the disk gauge 800, coupled to the base, as further detailed below.

FIG. 10 shows an internal, side perspective view of the alternate handle 700. The handle coupler 710 connects to the main body 705 and to the movement transfers 715. The movement transfers 715 include a movement point 720 that engages the disk gauge 800, which sits on the plate 725. The movement transfers 715, movement point 720, disk gauge 800, and plate 725 are all located within the base 701.

Figure 11:
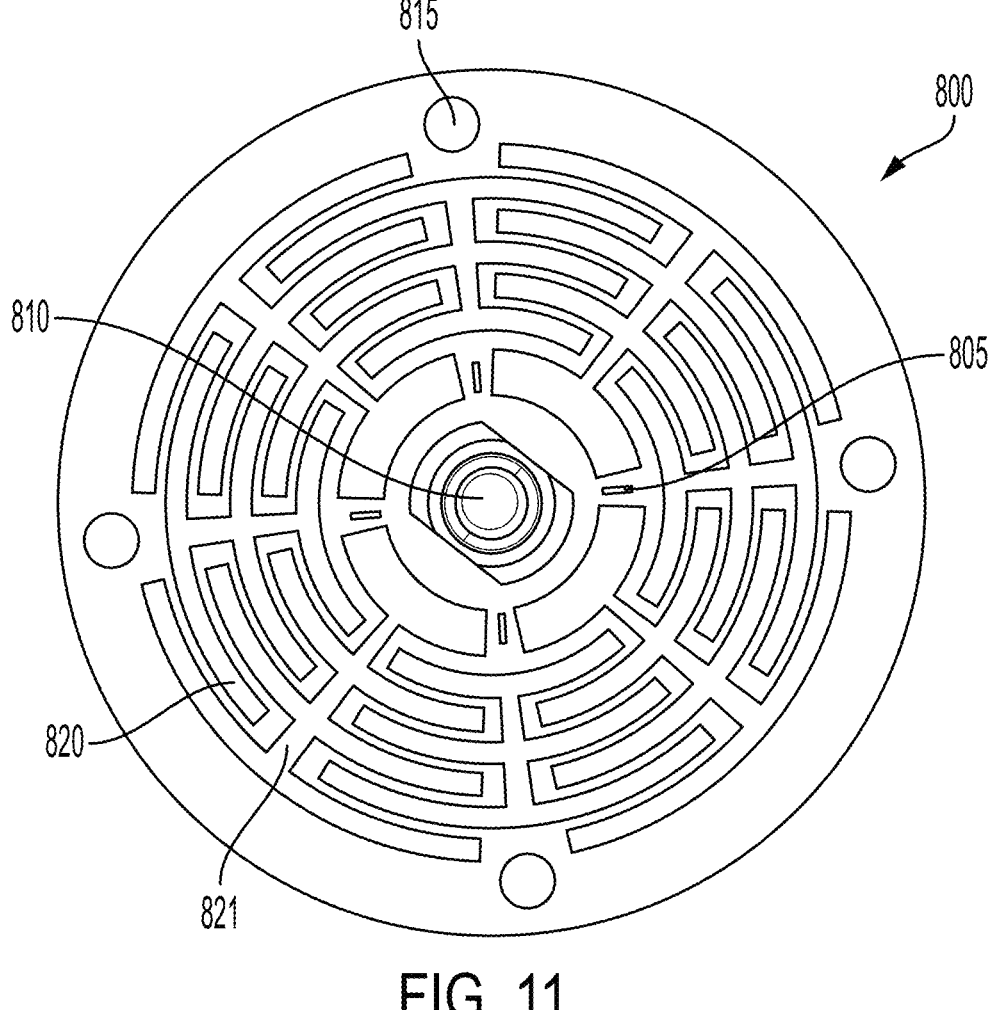
FIG. 11 illustrates a top view of a disk gauge for an alternate one-hand weapon system control handle, according to an example embodiment of the present disclosure.

Notably, the movement point 720 engages with the disk gauge 800 via an engagement point 810 (see FIG. 11). As such, when the user moves the handle 700, the force is transferred through the handle coupler 710, to the movement transfers 715, through the movement point 720, and to the disk gauge 800, where it causes movement. The movement point 720 can move radially around a 360-degree range.

As seen in FIG. 11, the disk gauge 800 is circular in shape and includes an engagement point 810 in the center and anchoring perforations 815 for selective coupling to the plate 725. In this embodiment, the disc gauge 800 is comprised of 17-4 steel at a thickness of 0.063 inches and an outer diameter of 2.00 inches, and is selectively coupled using a screw. The engagement point 810 is a circular perforation, which is 0.25 inches in diameter in this embodiments. The disk gauge 800 further includes quarter-circle serrations 820 that are located in a concentric-like pattern radiating outwardly from the engagement point 810, as seen in FIG. 11, so as to create a serrated section 821. The geometry and dimensions of the serrations 820 can vary such that the serrated section 821 is configured to withstand deflection forces transferred from movement of the main body 705. For example, disk gauges 800 comprised of materials with a higher stiffness factor include wider serrations.

Relatedly, in this embodiment, strain gauges 805 are coupled to the side of the disk gauge 800 facing the movement point 720 at four points at a distance close to the engagement point 810 by way of an epoxy. A wire opening (not shown) guides wires coming from the strain gauges 805 on the disk gauge 800 to a CPU board. It should be noted that the location and number of strain gauges 805 could vary in different embodiments. Importantly, when a force is placed on the disk gauge 800, the force activates the strain gauges 805. When the strain gauges 805 activate, they transmit corresponding signals, in the form of a voltage, to a CPU board. The CPU board then processes the incoming signals into corresponding X-Y plane positions of the handle 700.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention is claimed as follows:

1. A weapon system control handle, comprising:
a main body;
a deflection collar;
a base; and
a gauge shaft, wherein the gauge shaft has a first end and a second end and includes a plurality of strain gauges and eight equally spaced rows of serrations, such that the last of the rows is 0.5 inches from the second end of the gauge shaft,
wherein the main body is coupled to the gauge shaft, wherein the gauge shaft is coupled to the base, wherein the deflection collar is coupled to the base, wherein the gauge shaft is disposed within an inner diameter of the deflection collar, and wherein the gauge shaft is coupled to the main body at the first end and the gauge shaft is coupled to the base at the second end.

2. The weapon systems control handle of claim 1, wherein the gauge shaft is comprised of a 17-4 steel alloy.

3. The weapon systems control handle of claim 1, wherein the gauge shaft has a hollow, cylindrical shape and includes a plurality of serrations, such that the plurality of serrations are configured to deflect in a radial direction.

4. The weapon systems control handle of claim 3, wherein the plurality of serrations are rectangular in geometry and arranged such that there are rows of four equally spaced rectangular serrations around an diameter of the gauge shaft.

5. The weapon systems control handle of claim 1, wherein there are four strain gauges coupled to the gauge shaft at locations between four rectangular serrations on the row located seventh in from the second end of the gauge shaft.

6. The weapon systems control handle of claim 1, wherein the plurality of strain gauges are coupled to the gauge shaft via an epoxy.

7. The weapon systems control handle of claim 1, wherein the plurality of strain gauges are configured to generate a voltage in response to deflection in a radial direction.

8. The weapon systems control handle of claim 7, further comprising a CPU board connected to the plurality of strain gauges and configured to receive voltage generated by the plurality of strain gauges, and process the voltage in a real-time X-Y location.

9. A control handle gauge shaft that includes a first end, a second end, a plurality of serrations, and a plurality of strain gauges, wherein the plurality of strain gauges are configured to generate a voltage in response to deflection in a radial direction and wherein the control handle gauge further comprises a CPU board connected to the plurality of strain gauges and configured to receive voltage generated by the plurality of strain gauges, and process the voltage in a real-time X-Y location.

10. The control handle gauge shaft of claim 9, wherein the control handle gauge shaft is comprised of 17-4 steel alloy.

11. The control handle gauge shaft of claim 9, wherein the gauge shaft has a hollow, cylindrical shape.

12. The control handle gauge shaft of claim 11, wherein the gauge shaft has a hollow, cylindrical shape with an outer diameter of 0.6 inches and an inner diameter of 0.5 inches.

13. The control handle gauge shaft of claim 9, further comprising a wire opening.

14. The control handle gauge shaft of claim 9, wherein the distance from the first end to the second end is 5 inches.

15. The control handle gauge shaft of claim 9, wherein the plurality of serrations are rectangular in geometry and arranged such that there are rows of four equally-spaced rectangular serrations around an diameter of the control handle gauge shaft, and the gauge shaft includes eight equally-spaced rows of serrations, such that the last of the rows is 0.5 inches from the second end of the gauge shaft.

16. The control handle gauge shaft of claim 15, wherein the plurality strain gauges are four strain gauges, and wherein the four strain gauges are coupled to the gauge shaft at the locations between the four rectangular serrations on the row located seventh in from the second end of the gauge shaft.

17. The control handle gauge shaft of claim 9, wherein the plurality of serrations are configured to deflect in radial direction from 0 to 360 degrees in response to mechanical force.

18. A weapon system control handle, comprising:
a main body;
a deflection collar;
a base;
a gauge shaft, wherein the gauge shaft has a first end and a second end and includes a plurality of strain gauges; and
a CPU board connected to the plurality of strain gauges and configured to receive voltage generated by the plurality of strain gauges, and process the voltage in a real-time X-Y location,
wherein the main body is coupled to the gauge shaft, wherein the gauge shaft is coupled to the base, wherein the deflection collar is coupled to the base, wherein the gauge shaft is disposed within an inner diameter of the deflection collar, and wherein the gauge shaft is coupled to the main body at the first end and the gauge shaft is coupled to the base at the second end; and
wherein the plurality of strain gauges are configured to generate a voltage in response to deflection in a radial direction.

19. The weapon systems control handle of claim 18, wherein the gauge shaft has a hollow, cylindrical shape and includes a plurality of serrations, such that the plurality of serrations are configured to deflect in a radial direction.

20. The weapon systems control handle of claim 18, wherein the plurality of strain gauges are configured to generate a voltage in response to deflection in a radial direction.

* * * * *